United States Patent [19]

Shiga et al.

[11] 4,412,049

[45] Oct. 25, 1983

[54] PROCESS FOR PRODUCING HIGHLY STEREOREGULAR α-OLEFIN POLYMERS

[75] Inventors: Akinobu Shiga; Yukio Naito; Toshio Sasaki; Junpei Kojima; Hiroshi Yoshioka, all Niihama, Japan

[73] Assignee: Sumitomo Chemical Company, Limited, Osaka, Japan

[21] Appl. No.: 456,560

[22] Filed: Jan. 10, 1983

Related U.S. Application Data

[63] Continuation-in-part of Ser. No. 300,694, Sep. 10, 1981, abandoned.

[30] Foreign Application Priority Data

| Sep. 29, 1980 [JP] | Japan | 55-136067 |
| Sep. 29, 1980 [JP] | Japan | 55-136068 |
| Sep. 29, 1980 [JP] | Japan | 55-136069 |
| Sep. 29, 1980 [JP] | Japan | 55-136070 |
| Sep. 29, 1980 [JP] | Japan | 55-136072 |
| Sep. 29, 1980 [JP] | Japan | 55-136073 |
| Sep. 29, 1980 [JP] | Japan | 55-136074 |

[51] Int. Cl.$^3$ .......................... C08F 4/02; C08F 10/06
[52] U.S. Cl. .................................. 526/127; 526/125; 526/128; 526/142; 526/351; 502/116; 502/126
[58] Field of Search ............... 526/125, 127, 128, 142, 526/151

[56] References Cited

U.S. PATENT DOCUMENTS

| 4,076,924 | 2/1978 | Toyota et al. | 526/125 |
| 4,085,276 | 4/1978 | Toyota et al. | 526/125 |
| 4,115,319 | 9/1978 | Scata et al. | 526/142 |
| 4,143,223 | 3/1979 | Toyota et al. | 526/125 |
| 4,172,050 | 10/1979 | Gessell | 526/151 |
| 4,223,117 | 9/1980 | Sano et al. | 526/125 |
| 4,235,984 | 11/1980 | Shiga et al. | 526/127 |
| 4,258,167 | 3/1981 | Tsubaki et al. | 526/127 |
| 4,298,718 | 11/1981 | Mayr et al. | 526/125 |

FOREIGN PATENT DOCUMENTS

| 18025 | 10/1980 | European Pat. Off. | 526/125 |
| 1305610 | 2/1973 | United Kingdom | 526/125 |
| 1492618 | 11/1977 | United Kingdom . | |

*Primary Examiner*—Edward J. Smith
*Attorney, Agent, or Firm*—Stevens, Davis, Miller & Mosher

[57] ABSTRACT

A process for producing highly stereoregular α-olefin polymers which comprises polymerizing α-olefins in the presence of a catalyst system comprising:
(A) a solid catalyst obtained by contact reaction between
  (a) a solid product prepared by reacting an organomagnesium compound with at least one of halogenated silicon compound (I) and halogenated aluminum compound (II) in a solvent and
  (b) a titanium compound having both titanium-aryloxy and titanium-halogen linkages, and
(B) an organo-aluminum compound as an activating agent.

41 Claims, No Drawings

PROCESS FOR PRODUCING HIGHLY STEREOREGULAR α-OLEFIN POLYMERS

CROSS-REFERENCE TO RELATED APPLICATION

This is a continuation-in-part of application Ser. No. 300,694 filed Sept. 10, 1981, now abandoned.

The present invention relates to a process for producing α-olefin polymers of high stereoregularity. Generally, it is well known that crytalline olefin polymers are produced with the so-called Zielger-Natta catalyst comprising a compound of a transition metal in Groups IV to VI of the periodic table and a metal in Groups I to III of the same table or an organo-compound thereof. In the industrial production of olefin polymers from olefins such as propylene, butene-1 and the like, titanium trichloride compositions, or titanium tetrachloride or titanium trichloride deposited on a magnesium-containing halide carrier are used as catalyst. In this process, the polymers are commonly obtained as slurry, and their bulk density, average particle size and particle size distribution affect production capacity so largely that these are important factors in terms of improvement in the efficiency of reactor.

In general, polymerization processes with a catalyst on carrier have the drawbacks that the resulting polymers are small in bulk density and average particle size and are broad in particle size distribution. This process produces amorphous polymers as by-products in addition to highly stereoregular olefin polymers of high industrial value. The amorphous polymers have little industrial value and exert a large adverse effect on the mechanical properties of the processed products of the olefin polymers such as film, fiber and the like. Further, formation of the amorphous polymers uselessly consumes a monomer as raw material, and at the same time equipments for removal of the polymers become necessary. This is a serious disadvantage from the industrial point of view. Consequently, if the formation of such amorphous polymers is completely, or, if any, substantially inhibited, this becomes a great advantage.

On the other hand, catalyst residues remain in the olefin polymers produced by this process, adversely affecting the stability and processability of the polymers. Accordingly, equipments for removal of the catalyst residues and stabilization of the polymers become necessary. These derawbacks of the process can be improved by increasing a catalytic activity which is expressed in the yield of olefin polymer per unit weight of catalyst. Further, equipments for removal of the catalyst residues become unnecessary, which makes it possible to reduce the manufacturing cost of the olefin polymer.

One example of ethylene polymerization with a magnesium-containing supported catalyst is disclosed in British Pat. No. 1,286,867 in which ethylene was polymerized using a titanium tetrachloride catalyst supported on active anhydrous magnesium chloride together with an organo-aluminum compound, said active anhydrous magnesium chloride being produced by pulverization of anhydrous magnesium chloride by ball mills, evaporation of methanol solutions of ethylmagnesium chloride dissolved in ethyl ether with hydrogen chloride. Another example is reported in British Pat. No. 1,305,610 in which ethylene was polymerized using an alkoxytitanium chloride or phenoxytitanium chloride catalyst or the like supported on the same active anhydrous magnesium chloride as above together with an organo-aluminum compound.

Many methods for producing supported catalysts for the polymerization of α-olefins (e.g. propylene), for example, the method comprising co-pulverizing magnesium chloride, a silicone compound and an ester, and reacting the co-pulverized product with titanium tetrachloride (Japanese Patent Publication No. 36786/1977) and the method comprising co-pulverizing magnesium chloride, an organic ester and an alcohol or phenol, and reacting the co-pulverized product with titanium tetrachloride [Japanese Patent Application Kokai (Laid-open) No. 104593/1977] have been proposed. In these methods, pulverization is essential to the production of the catalysts, and wrtihout pulverization, the resulting catalysts are extremely poor in activity. While, because of the pulverization, the catalysts become too fine so easily that they give a polymer having a large proportion of fine powder and a very broad particle size distribution. Such polymer is also very low in bulk density. Further, the above catalysts are poor in polymerization activity and stereoregularity, so that they are too unsatisfactory for use in the industrial streoregular polymerization of α-olefins.

There is also a method including no pulverization. For example, Japanese Patent Application Kokai (Laid-open) Nos. 28189/1976 and 92885/1976 disclose a method which comprises treating magnesium chloride with an alcohol, an ester and a halogenated aluminum, halogenated silicon or halogenated tin compound and then depositing titanium tetrachloride on the treated product. Like the foregoing catalysts produced by pulverization, a catalyst obtained by this method also gives a polymer having a large proportion of fine powder, and besides it is unsatisfactory in activity, and stereoregularity of produced polymer.

Previously, the present inventors produced a solid catalyst by reacting an organo-magnesium compound with a halogenated silicon compound and/or halogenated aluminum compound, treating the resulting solid product with an electron donor and depositing titanium tetrachloride on the resulting solid carrier, and found that this solid catalyst shows a high activity in the polymerization of α-olefins and gives a polymer having a high stereoregularity, high bulk density, large particle size and narrow particle size distribution [Japanese Patent Application Kokai (Laid-open) Nos. 112,983/1979 and 119,586/1979]. The inventors further extensively studied to obtain a catalyst which is higher in catalytic activity and capable of producing α-olefin polymers having a higher stereoregularity than in the above methods. As a result, it was found that a solid catalyst, as obtained by contact reaction between said solid product and a specified titanium compound, is capable of polymerizing α-olefins such as propylene, with a very high activity and wihout losing the foregoing characteristics, into polymers of high stereoregularity. The inventors thus attained to the present invention.

According to the present invention, there is provided a process for producing α-olefin polymers of high stereoregularity which comprises polymerizing an α-olefin having not less than three carbon atoms or copolymerizing said α-olefin with another olefin having not less than two carbon atoms in the presence of a catalyst system comprising:

(A) a solid catalyst obtained by contact reaction between (a) a solid product prepared by reaction of an organo-magnesium compound with at least one of the following halogen-containing compounds (I) and (II) in a solvent,
 (I) halogenated silicon compounds of the formula, $R_nSiX_{4-n}$, in which R is a hydrocarbon group having 1 to 8 carbon atoms, X is a halogen atom and n is a number satisfying $0 \leq n < 4$,
 (II) halogenated aluminum compound of the formula, $R_lAlX_{3-l}$, in which R is a hydrocarbon group having 1 to 8 carbon atoms, X is a halogen atom and l is a number satisfying $0 \leq l < 3$, and
(b) a titanium compound having both titanium-aryloxy and titanium-halogen linkages, and
(B) an organo-aluminum compound as an activating agent.

The method of the present invention has the following characteristics:

(1) Catalytic efficiencies per solid catalyst and titanium atom are very high. This extremely decreases the contents of residual transition metal (titanium) and halogen in produced polymers which lower the physical properties of the polymers such as color, thermal stability, anti-corrosion property, anti-foaming property, etc., making removal of residual catalyst unnecessary.

(2) A high catalytic activity as described above and a very high stereoregularity are attained at the same time. This decreases the amount of amorphous polymers of low industrial value which remain in produced polymers to lower the mechanical properties thereof and the physical properties of film such as blocking resistance, making removal of amorphous polymers unnecessary.

(3) A solid catalyst of high activity producing polymes of high stereoregularity is obtained very simply and cheaply.

(4) The amount of hydrogen for molecular weight adjustment on polymerization may be decreased with easy adjustment of molecular weight.

(5) Polymers obtained have a uniform-sized spherical or spheroidal particle form, being very easy in handling.

(6) Adhesion of polymer particles to reactors and pipes on polymerization is little, making prolonged stable running easy.

The organo-magnesium compound used for reaction with a halogenated silicon compound and/or halogenated aluminum compound may be any type of compound produced by the well-known reaction between an organohalogen compound and metallic magnesium. Generally, however, Grignard compounds of the formula, RMgX (in which R is a hydrocarbon group having 1 to 8 carbon atoms and X is a halogen atom) and dialkyl magnesium compounds of the formula, RR'Mg (in which R and R' are each a hydrocarbon group having 1 to 8 carbon atoms) are preferably used. Specific examples of the Grignard compound include for example ethylmagnesium chlride, n-propylmagnesium chloride, n-butylmagnesium chloride, isoamylmagnesium chloride, allylmagnesium chloride, phenylmagnesium chloride, n-butylmagnesium bromide and ethylmagnesium iodide. Of these compounds, organo-magnesium chlorides synthesized from organic chlorides, for example n-propylmagnesium chloride and n-butylmagnesium chloride, are particularly preferred.

Specific examples of the dialkylmagnesium compound include for example diethylmagnesium, di-n-propylmagnesium, di-n-butylmagnesium, di-n-hexylmagnesium, n-butylethylmagnesium and diphenylmagnesium.

Thse organo-magnesium compounds are synthesized as a homogeneous solution or a suspension in a solvent. The solvent includes for example ether solvents (e.g. diethyl ether, di-n-propyl ether, di-n-butyl ether, diisoamyl ether, tetrahydrofuran), hydrocarbon solvents (e.g. hexane, heptane, octane, cyclohexane, benzene, toluene, xylene) or mixtures thereof.

Of these solvents, ether solvents are preferred, and their amount is 0.1 to 10 times by mole, particularly preferably 0.5 to 5 times by mole based on 1 mole of the organo-magnesium compound.

The halogenated silicon compound used for reaction with the oganomagnesium compound is represented by the formula, $R_nSiX_{4-n}$ (in which R is a hdyrocarbon group having 1 to 8 carbon atoms, X is a halogen atom and n is a number satisfying the equation, $0 \leq n < 4$ preferably $0 \leq n \leq 1$). A larger number of chlorine atoms is desirable. Specific examples of the halogenated silicon compound include for example silicon tetrachloride, silicon tetrabromide, methylsilyl trichloride, dimethylsilyl dichloride, trimethylsilyl chloride, ethylsilyl trichloride, n-propylsilyl trichloride, n-butylsilyl trichloride, methylsilyl tribromide, vinylsilyl trichloride and phenylsilyl trichloride. Of these compounds, silicon tetrachloride is particularly preferred.

The halogenated aluminum compound used for reaction with the organo-magnesium compound is represented by the formula, $R_lAlX_{3-l}$ (in which R is a hydrocarbon group having 1 to 8 carbon atoms, X is a halogen atom and l is a number satisfying the equation, $0 \leq l < 3$ preferably $0 \leq l \leq 2$). Specific examples of the halogenated aluminum compound include for example anhydrous aluminum chloride, anhydrous aluminum bromide, ethylaluminum dichloride, n-propylaluminum dibromide, diethylaluminum chloride, di-n-propylaluminum chlride, methylaluminum sesquichloride and ethylaluminum sesquichloride. Of these compounds, anhydrous aluminum chloride, ethylaluminum dichloride, diethylaluminum chloride and ethylaluminum sesquichloride are particularly preferred.

The reaction of the organo magnesium compound with the halogenated silicon and/or halogenated aluminum compound is carried out generally at $-50°$ to $150°$ C., preferably $-30°$ to $80°$ C.

The solvent used for this reaction is an ether compound or a mixture of an ether compound and a hydrocarbon compound. Specific examples of the ether compound include, for example, aliphatic or cyclic ethers having 4 to 10 carbon atoms (e.g. diethyl ether, di-n-propyl ether, diisopropyl ether, di-n-butyl ether, diisoamyl ether, tetrahydrofuran, dioxane). Specific examples of the hydrocarbon compound include, for example, aliphatic hydrocarbons (e.g. n-pentane, n-hexane, n-heptane, n-octane, n-decane), aromatic hydrocarbons (e.g. benzene, toluene, xylene), alicyclic hydrocarbons (e.g. cyclohexane, methylcyclohexane).

Preferably, this reaction is carried out by adding dropwise the halogen-contaning compound or a solution of the compound in the above solvent to a solution of the organo-magnesium compound or adding in a reverse way. The reaction time is generally 10 minutes or more, preferably 0.5 to 10 hours. The molar ratio of the organo-magnesium compond to the halogen-containing compound is 1:10 to 10:1, preferably 1:2 to 2:1. The solid product thus obtained is separated from the reaction mixture, for example, by allowing the mixture to stand still and removing the supernatant liquor, and then thoroughly washed with a purified inert hydrocarbon solvent (e.g. pentane, hexane, heptane, octane, benzene, xylene, cyclohexane, methylcyclohexane, decalin). The solid product is then used, after dried or as it is, for subsequent reaction.

This solid product contains about 0.1 to several percent by weight of silicon and/or aluminum atoms, and when the ether solvent is used, the solid product contains about 10 to about 60% by weight of the ether. This product shows an X-ray diffraction pattern different from that of magnesium chloride.

The solid product (a) thus obtained is used for subsequent contact reaction with a titanium compound (b), but prior to this, it may be contact-treated with an electron donor. The electron donor includes for example amines, amides, ethers, esters, ketones, nitriles, phosphines, phosphites and sulfides, of which esters are preferered. The esters include olefinic, aliphatic, alicyclic and aromatic carboxylic acid esters and the like, and of these, olefinic carboxylic acid esters and aromatic monocarboxylic acid esters, particularly the latter, are preferred. Specifically, methyl benzoate, ethyl benzoate, ethyl p-anisate and the like are given.

The amount of electron donor used is $10^{-5}$ to 0.1 mole, preferably $5 \times 10^{-4}$ to 0.02 mole per gram of solid product. Amounts less than $10^{-5}$ mole have no effect to improve stereoregularity, and amounts more than 0.1 mole result in remarkable reduction in polymerization activity.

Contact between the solid procuct and the electron donor may be carried out by any of the well-known methods such as slurry process, mechanical pulverization by means of ball mills and the like. Particularly, the slurry process bringing the both into contact in the presence of a diluent is advantageous in terms of particle form and particle size distribution. As the diluent, there are given aliphatic hydrocarbons (e.g. pentane, hexane, heptane, octane), aromatic hydrocarbons (e.g. benzene, toluene, xylene) and alicyclic hydrocarbons (e.g. cyclohexane, cyclopentane).

The amount of diluent used is gnerally 0.1 to 1000 ml, preferably 1 to 100 ml per gram of solid product. The reaction temperature is generally $-50°$ to $150°$ C., preferably $0°$ to $100°$ C., and the reaction time is generally more than 10 minutes, preferably 30 minutes to 3 hours.

After contact-treatment with the electron donor, the solid product may be washed with inert hydrocarbon solvents, or without washing, used for subsequent contact reaction with the titanium compound. The electron donor may be brought into contact with the solid product (a) in mixture with the titanium compound (b) described hereinafter. The amount of electron donor based on the solid product is the same as above.

This contact-treatment with the electron donor improves to some degree the activity of solid catalysts obtained and stereoregularity of polymers, while it generally incrases the amount of hydrogen for molecular wight adjustment.

The catalyst of the present invention is characterized in that it exhibits sufficiently high activity and stereoregularity without the foregoing contact-treatment with electron donors.

The titanium compound used in the present invention refers to ones having both a titanium-aryloxy linkage and a titanium-halogen linkage. Preferred compounds of these are such that the ratio of the number of the former linkages to that of titanium atoms is less than 1. Also, the titanium compound of the present invention includes mixtures of a plural number of titanium-containing compounds.

The valence of titanium is 4.

A preferred titanium compound is aryloxy titanium halides represented by the formula, $Ti(OAr)_nX_{4-n}$, in which OAr is an aryloxy group, X is halogen and n is a number satisfying $0.1 \leq n \leq 0.8$, preferably $0.2 \leq n \leq 0.7$, more preferably $0.3 \leq n \leq 0.5$. Halogen includes chlorine, bromine and iodine, of which chlorine is preferred.

A preferred aryloxy group is a phenoxy group and/or a substituted phenoxy group. As the substituent of the substituted phenoxy group, there are given hydrocarbyl groups (e.g. $C_1-C_{18}$ alkyl, $C_6-C_{18}$ aryl), oxygen-containing organic groups (e.g. $C_1-C_{18}$ alkoxyl, $C_6-C_{18}$ aryloxy, $C_1-C_{18}$ acyl, ester), sulfur-containing organic groups (e.g. $C_1-C_{18}$ alkylthio, $C_6-C_{18}$ arylthio), nitrogen-containing groups (e.g. amino, $C_1-C_{18}$ alkylamino, $C_6-C_{18}$ arylamino, nitro, cyano) and halogens. The substituted phenoxy group may contain a plural number of substituents. Of these substituents, hydrocarbyl, halogen, alkoxy and aryloxy groups are preferred.

Specifically, the aryloxy groups include phenoxy, p-methylphenoxy, p-ethylphenoxy, p-isopropylphenoxy, p-tert-butylphenoxy, p-phenylphenoxy, 2-naphthyloxy, p-chlorophenoxy, p-bromophenoxy, p-iodophenoxy, p-methoxyphenoxy, p-ethoxyphenoxy, p-phenoxyphenoxy, 4-methyl-2-tert-butylphenoxy, o-methylphenoxy, o-tert-butylphenoxy, o-phenylphenoxy, 1-naphthyloxy, o-chlorophenoxy, o-methoxyphenoxy, o-phenoxyphenoxy, m-methylphenoxy and m-chlorophenoxy groups. Of these, a phenoxy group and hydrocarbylphenoxy groups such as p-methylphenoxy, o-methylphenoxy and o-phenylphenoxy groups are particularly preferred.

The use of such specified aryloxy titanium halides leads to remarkable improvement in catalytic activity and stereoregularity as compared with the use of a titanium halide or titanium halide treatment of a phenol compound pretreated carrier.

The titanium compound can be synthesized by the well-known methods.

One of the methods is synthesis by substitution reaction between the corresponding halogen-containing titanium compound and corresponding phenol compound. When the both compounds are mixed, reaction generally proceeds with evolution of hydrogen halide. For the purpose of the present invention, the substitution reaction needs to be substantially completed. Completion of the rection can be confirmed by no absorption of OH group in the infrared absorption spectrum of reaction products. For example, when 0.1 mole of titanium tetrachloride is mixed with 0.05 mole of phenol at $120°$ C., violent evolution of HCl gas continues for about 30 minutes, producing a titanium compound of the average composition, $(C_6H_5O)_{0.5}TiCl_{3.5}$, i.e. a mixture of $(C_6H_5O)TiCl_3$ and $TiCl_4$ in a molar ratio of 1:1.

Another method is the use of a reaction product from disproportional between the orthotitanic acid ester of corresponding phenol compound and corresponding halogen-containing titanium compound. For example, when 0.39 mole of titanium tetrachloride is mixed with 0.01 mole of tetra-p-methylphenoxy titanium, a titanium compound of the average composition, $(4-CH_3-C_6H_5O)_{0.1}-TiCl_{3.9}$, i.e. a mixture of $(4-CH_3-C_6H_5O)-TiCl_3$ and $TiCl_4$ in a molar ratio of 1:9, is obtained.

As the halogen-containing titanium compound used in the above synthesis, there are given titanium tetrahlides (e.g. titanium tetrachloride, titanium tetrabromide)

and halogenated titanates (e.g. methoxy-titanium trichloride, ethoxytitanium trichloride). Of titanium tetrahalides, titanium tetrachloride is preferred.

Contact reaction between the solid product (a), which may or may not be contact-treated with the electron donor in advance, and the titanium compound (b) may be carried out by the well-known methods such as pulverization by means of ball mills or vibrating mills. For preventing particle characteristics from lowering, however, slurry metods wherein the solid product (a) is slurried in a liquor containing the titanium compound, or impregnation methods wherein the solid product (a) is impregnated with a liquor containing the titanium compound, are preferred.

The liquor containing the titanium compound may be a liquid titanium compound itself, but preferably, it is a solution of the compound in an inert solvent.

As the inert solvent used for dissolving the titanium compound, there are given aliphatic hydrocarbons (e.g. hexane, heptane, octane, liquid paraffin), alicyclic hydrocarbons (e.g. cyclohexane, methylcyclohexane), aromatic hydrocarbons (e.g. benzene, toluene, xylene), aliphatic halogenated hydrocarbons (e.g. methylene chloride, dichloroethane, trichloroethane, trichloroethylene), aromatic halogenated hydrocarbons (e.g. chlorobenzene, dichlorobenzene, trichlorobenzene) and mixturs thereof. Of these solvents, aromatic hydrocarbons and/or halogenated ones, particularly aromatic halogenated ones are preferered.

The concentration of titanium compound in the solution is generally 5 to 90%, preferably 10 to 70% by volume.

By contact reaction of the solid product (a) with the above titanium compound (b) dissolved in the solvent, the activity of catalyst and the stereoregularity of polymer improve more remarkably than in contact reaction in the absence of solvent, not to speak of contact reaction with titanium halide.

The amount of titanium compound-containing solution per gram of solid product (a) is 0.1 to 100 ml preferably about 0.5 to about 50 ml. Preferably, this contact reaction is carried out at 0° to 150° C. The reaction time is more than a few minutes, preferably 30 minutes to 3 hours. After the contact reaction, the resulting reacted solid is generally separated from the reaction mixture. It is desirable to thoroughly wash the solid with an inert solvent. The solid catalyst (A) of the present invention is thus obtained.

The organo-aluminum compound (B) used in the present invention as an activating agent is represented by the formula, $R_m^2AlY_{3-m}$, wherein $R^2$ is a $C_{1-8}$ straight or branched alkyl, alicyclic or aromatic hydrocarbon group, Y is halogen or hydrogen and m is a number satisfying $2 \leq m \leq 3$, are used.

Specific examples of organo-aluminum compound include trialkylaluminum, a mixture of trialkylaluminum and dialkylaluminum halide, and dialkylaluminum hydride. Particularly, triethylaluminum and a mixture of triethylaluminum and diethylaluminum chloride are preferred.

The molar ratio of the titanium atom in the solid catalyst to the activating agent used for α-olefin polymerization may be selected from a range of 10:1 to 1:1000. Particularly, a range of 2:1 to 1:600 is preferably used.

In the method of the present invention, α-olefins are polymerized or copolymerized in the presence of the solid catalyst (A) and the activating agent (B), but the well-known electron donor (C) may be added to the reaction system. Addition of the electron donor generally improves the stereoregularity but lowers the catalytic activity.

Specific examples of the electron donor include, for example amines, amides, ethers, esters, ketones, nitriles, phosphines, phosphites and sulfides. Of these compounds, esters of aromatic monocarboxylic acid, for example methyl benzoate, ethyl benzoate, methyl p-toluate and ethyl p-anisate, are particularly preferred.

The molar ratio of the activating agent to the electron donor is within a range of 100:1 to 1:10, preferably 10:1 to 1:1.

The electron donor may be mixed with the activating agent before use. A preferred combination of the compound and the agent is that of triethylaluminum and said ester and that of triethylaluminum, diethylaluminum chloride and said ester.

Polymerization may be carried out over a wide range of $-30°$ to 200° C. But, a range of 0° C. to 100° C. is generally preferred.

The polymerization pressure is not particularly limited, but pressure of about 3 to about 100 atom. is preferred in terms of the industrial and economical points of view.

Polymerization may be carried out by either a continuous process or a batchwise one. Further, it may be carried out by any of the slurry polymerization using an inert hydrocarbon solvent (e.g. propane, butane, pentane, hexane, heptane, octane), the liquid-phase polymerization in liquid α-olefins and the gas-phase polymerization.

α-Olefins used in the present invention are those having 3 or more carbon atoms. Specific examples of α-olefin include for example propylene, butene-1, pentene-1, hexene-1, 3-methyl-pentene-1 and 4-methyl-pentene-1. But the present invention is not limited to these compounds. The present method can be applied not only to polymerization but also to copolymerization (including copolymerization with ethylene). In the copolymerization, copolymers can be obtained by using two or more of the α-olefin.

Also, the method of the present invention can easily be applied to hetero-block copolymerization in which polymerization is carried out in two steps or more.

The present invention will be illustrated with reference to the following examples, but not limited thereto.

EXAMPLE 1

(A) Synthesis of organo-magnesium compound

To a 1-liter flask equipped with a stirrer, a reflux condenser and a dropping funnel was added magnesium chip (12 g) for Grignard reagent. After replacing atmosphere in the flask by argon, di-n-butyl ether (250 ml) was added, and then n-butyl chloride (62 ml, 1.2 times by mole based on magnesium) was added dropwise to start reaction with the contents of the falsk kept at 50° C. After addition over 2 hours at 50° C., reaction was continued at this temperature for further 5 hours to obtain a di-n-butyl ether solution of n-butylmagnesium chloride. The concentration of this solution was 1.45 mole/liter.

(B) Synthesis of solid product

To the n-butylmagnesium chloride solution synthesized in (A) was added dropwise silicon tetrachloride (55 ml), as a dilute solution in toluene (112 ml) (molar ratio of Mg to Si, 1:1), from a dropping funnel to start reaction with the contents of the flask kept at 20° C. The dropwise addition was carried out at 20° C. over 3 hours to form white precipitate. After reaction at this temperature for further 1 hour, the reaction solution was allowed to stand, and the supernatant liquor was separated. The product was washed with n-heptane and dried under reduced pressure to obtain 65 g of a solid product.

(C) Synthesis of titanium compound

Atmosphere in a 200-ml flask equipped with a stirrer and a thermometer was replaced by argon, and titanium tetrachloride (35.7 ml) and phenol (15.3 g) were added, followed by heating to 120° C. Reaction proceeded with evolution of hydrogen chloride gas. After keeping this temperature for 1 hour, a dark red reaction solution (1 ml) was sampled, and its infrared absorption spectrum was measured to detect no absorption due to the stretching vibration of the OH group of phenol. Thus, a liquid titanium compound of the average composition, $Ti(O-C_6H_4-4-CH_3)_{0.5}Cl_{3.5}$, was obtained.

(D) Synthesis of solid catalyst

The solid product (5 g) obtained in (B) was added to the titanium compound-containing liquor obtained in (C), and contact reaction was carried out at 120° C. for 1 hour with stirring. After completion of the reaction, the reaction solution was allowed to stand, and the supernatant liquor was removed at 120° C. Thereafter, n-heptane (50 ml) was added, and the mixture was stirred at 90° C. for 5 minutes and allowed to stand, followed by removal of the supernatant liquor. This washing cycle was repeated 5 times. Drying under reduced pressure gave 3.2 g of a solid catalyst containing 3.3 wt. % of titanium atom.

(E) Polymerization of propylene (I)

Atmosphere in a 5-liter stainless steel autoclave equipped wih a stirrer was replaced by argon, and dry heptane (1.5 liter), triethylaluminum (0.75 g), methyl p-toluate (0.217 g), the solid catalyst (37.4 mg) synthesized in (D) and then hydrogen corresponding to a partial pressure of 0.14 kg/cm$^2$ were added.

After raising the temperature of the autoclave to 70° C., propylene was charged under pressure to 6 kg/cm$^2$G to start polymerization. Polymerization was continued for 90 minutes while maintaining the pressure by supply of propylene. After completion of the polymerization, introduction of the monomer was stopped, the unreacted monomer was purged and the catalyst was decomposed by the addition of butanol (100 ml).

The polymer produced was filtered off by Buchner filter, washed three times with 500-ml portions of heptane and dried at 60° C. to obtain 177.3 g of polypropylene.

Heptane in the filtrate was removed by steam distillation to obtain 10.5 g of an amorphous polymer.

The content of a heptane-insoluble portion in the total polymer (hereinafter referred to as HIP) was 94.4 wt. %, and the yield (g) of polypropylene per gram of solid catalyst (hereinafter referred to as PP/cat) was 5020.

(E) Polymerization of propylene (II)

Propylene was polymerized in the same manner as in (E) except that the amount of the solid catalyst synthesized in (D) was changed to 41.9 mg, a mixture of triethylaluminum (0.375 g) and diethylaluminum chloride (0.397 g) was used as organo-aluminum compound in place of triethylaluminum (0.75 g) and that ethyl p-anisate (0.3 g) was used in place of methyl p-toluate. Thus, 170.7 g of polypropylene powder and 8.4 g of an amorphous polymer was obtained. PP/cat was 4270 and HIP was 95.3 wt. %.

(G) Polymerization of propylene (III)

Atmosphere in a 5-liter stainless steel autoclave equipped with a stirrer was replaced by argon, and triethylaluminum (0.65 g), methyl p-toluate (0.257 g), the solid catalyst (35.2 mg) synthesized in (D) and then hydrogen corresponding to a partial pressure of 0.40 kg/cm$^2$G were added.

Liquid propylene (1.3 kg) was then charged under pressure, and polymerization was continued for 2 hours while maintaining the temperature of the autoclave at 65° C.

After completion of the polymerization, the unreacted monomer was purged, and methanol (100 ml) was added to decompose the catalyst.

Polypropylene produced was filtered off by Buchner filter and dried at 60° C. under reduced pressure to obtain 326.9 g of polypropylene.

PP/cat was 9290. Six hours' Soxhlet extraction with boiling heptane showed that the content of insoluble portion was 93.5 wt. %.

EXAMPLES 2 AND 3 AND COMPARATIVE EXAMPLE 1

A solid catalyst was synthesized in the same manner as in Example 1 except that, in the synthesis of titanium compound in (C), the amount of phenol was changed as shown in Table 1. Using the solid catalysts thus obtained of amounts shown in Table 1, propylene was polymerized under the same condition as in (E) of Example 1. The resuls are shown in Table 1.

TABLE 1

| No. | Amount of phenol (g) | Average composition of titanium compound | Amount of solid catalyst (mg) | PP/cat (g/g) | HIP (wt. %) |
|---|---|---|---|---|---|
| Example 2 | 3.06 | Ti(OC$_6$H$_5$)$_{0.1}$Cl$_{3.9}$ | 35.5 | 4980 | 94.5 |
| Example 3 | 21.7 | Ti(OC$_6$H$_5$)$_{0.7}$Cl$_{3.3}$ | 33.2 | 4650 | 94.0 |
| Comparative Example 1 | 30.6 | Ti(OC$_6$H$_5$)Cl$_3$ | 37.5 | 3320 | 93.4 |

COMPARATIVE EXAMPLE 2

A solid catalyst was synthesized in the same manner as in Example 1 except that the titanium compound in (C) was replaced by a liquid mixture of Ti(OC$_6$H$_5$)$_4$ (0.081 mole) and TiCl$_4$ (0.244 mole) having an average composition of Ti(OC$_6$H$_5$)Cl$_3$.

Propylene was polymerized under the same condition as in (E) of Example 1 using 43.3 mg of this solid catalyst. PP/cat Was 3550 and HIP was 93.2 wt. %.

EXAMPLE 4

Atmosphere in a 200-ml flask equipped with a stirrer and a thermometer was replaced by argon, and the solid product (10 g) obtained in (B) of Example 1 was added and slurried with addition of n-heptane (100 ml). Thereafter, ethyl benzoate (3.0 ml) was added with stirring, followed by contact reaction at 30° C. for 1 hour. After completion of the reaction, the product was separated, washed and dried under reduced pressure to obtain 9.7 g of a solid carrier.

A solid catalyst was synthesized in the same manner as in (D) of Example 1 except that the solid product was replaced by 5 g of this solid carrier. Propylene was then polymerized in the same manner as in (E) of Example 1 except that the solid catalyst obtained above was used, and that triethylaluminum (0.15 g) and no methyl p-toluate were used. PP/cat Was 15690 and HIP was 91.5 wt. %.

EXAMPLE 5

Propylene was polymerized under the same condition as in (E) of Example 1 using 38.1 mg of the solid catalyst synthesized in Example 6. PP/cat Was 5270 and HIP was 95.2 wt. %.

COMPARATIVE EXAMPLE 3

Atmosphere in a 200-ml flask equipped with a stirrer and a thermometer was replaced by argon, and the solid product (5 g) obtained in (B) of Example 1 and titanium tetrachloride (35.7 ml) were added, followed by contact reaction at 120° C. for 1 hour with stirring. After completion of the reaction, the product was separated, washed and dried under reduced pressure to obtain 2.8 g of a solid catalyst.

This solid catalyst contained 2.4 wt. % of titanium atom. Propylene was polymerized under the same condition as in (E) of Example 1 using 39.2 mg of this solid catalyst. PP/cat Was 1680 and HIP was 90.5 wt. %.

COMPARATIVE EXAMPLE 4

Atmosphere in a 200-ml flask equipped with a stirrer and a thermometer was replaced by argon, and the solid product (8 g) obtained in (B) of Example 1 was added and slurried with addition of n-heptane (80 ml). Thereafter, phenol (2.5 g) was added with stirring, followed by contact reaction at 50° C. for 1 hour. After completion of the reaction, the product was separated, washed and dried under reduced pressure to obtain a phenol-treated solid. Thereafter, a solid catalyst was synthesized in the same manner as in Comparative Example 1 except that this phenol-treated solid (5 g) was used in place of the solid product. Propylene was then polymerized under the same condition as in (E) of Example 1 using the solid catalyst botained above. PP/cat Was 2690 and HIP was 89.4 wt. %.

COMPARATIVE EXAMPLE 5

A solid catalyst was synthesized in the same manner as in Comparative Example 1 except that the solid product was replaced by the solid carrier (5 g) obtained in the same manner as in Example 6. Propylene was then polymerized in the same manner as in (E) of Example 1 except that this solid catalyst was used, and that triethylaluminum (0.15 g) and no methyl p-toluate were used.

COMPARATIVE EXAMPLE 6

A solid catalyst was synthesized in the same manner as in Comparative Example 2 except that the solid product was replaced by the solid carrier (8 g) obtained in the same manner as in Example 6. Propylene was then polymerized in the same manner as in (E) of Example 1 except that this solid catalyst was used, and that triethylaluminum (0.15 g) and no methyl p-toluate were used. PP/cat Was 11050 and HIP was 88.6 wt. %.

EXAMPLE 6

(A) Synthesis of organo-magnesium compound

To a 500-ml flask equipped with a stirrer, a reflux condenser and a dropping funnel was added magnesium chip (16.1 g) for Grignard reagent. The contents of the flask was heated to 120° C. for 2 hours while passing argon through the flask to completely expel moisture attached to the inside wall of the flask and the surface of magnesium. A mixture of n-butyl chloride (71 ml, equimolar amount based on magnesium) and diethyl ether (275 ml) was added dropwise from the dropping funnel to start reaction. After addition over 1 hour under reflux of diethyl ether, reaction was continued at this temperature for further 3 hours to obtain a diethyl ether solution of n-butylmagnesium chloride. The concentration of this solution was 2.0 mole/liter.

(B) Synthesis of solid product

Atmosphere in a 200-ml flask equipped with a stirrer, a dropping funnel and a thermometer was replaced by argon. Anhydrous aluminum chloride (10.7 g) purified by sublimation was added and dissolved in ethyl ether (50 ml) with ice cooling. Thereafter, n-butylmagnesium chloride (80 ml) synthesized in (A) was gradually added dropwise from the dropping funnel to form white precipitate. After completion of the addition, the reaction solution was raised to a temperature of 20° C. and reacted at this temperature for 1 hour.

After standing, the supernatant liquor was removed, and the product was washed three times with 50-ml portions of n-heptane and dried under reduced pressure to obtain 20.9 g of a white solid product.

(C) Synthesis of titanium compound

In the same manner as in (C) of Example 1, a liquid titanium compound of the average composition, Ti(OC$_6$H$_5$)$_{0.5}$Cl$_{3.5}$, was synthesized.

(D) Synthesis of solid catalyst

A solid catalyst was synthesized in the same manner as in (D) of Example 1 by adding the solid product (5 g) obtained in (B) above to the titanium compound-containing liquor obtained in (C) above.

(E) Polymerization of propylene

Propylene was polymerized under the same condition as in (E) of Example 1 except that the solid catalyst (41.2 mg) obtained in (D) above was used, and that ethyl p-anisate (0.3 g) was used in place of methyl p-toluate. PP/cat Was 4530 and HIP was 94.2 wt. %.

EXAMPLE 7

A solid catalyst was synthesized in the same manner as in Example 1 except that, in (A) of Example 1, di-isoamyl ether (300 ml) was used in place of di-n-butyl ether. Propylene was then polymerized under the same condition as in (E) of Example 1 except that this solid catalyst was used, and that ethyl p-anisate (0.3 g) was used in place of methyl p-toluate. PP/cat Was 4670 and HIP was 94.1 wt. %.

COMPARATIVE EXAMPLE 7

A liquid titanium compound of the average composition, Ti(OC$_4$H$_9$)Cl$_3$, was synthesized in the same manner as in (C) of Example 1 except that n-butyl alcohol (29.7 ml) was used in place of phenol and the reaction temperature was changed to 100° C. A solid catalyst was synthesized in the same manner as in (D) of Example 1 using this liquid titanium compound. Propylene was then polymerized under the same condition as in (E) of Example 1 using 45.6 mg of this solid catalyst. PP/cat Was 1310 and HIP was 90.0 wt. %.

COMPARATIVE EXAMPLE 8

A liquid titanium compound of the average composition, $Ti(OCH_2\text{-}C_6H_5)Cl_3$, was synthesized in the same manner as in (C) of Example 1 except that benzyl alcohol (33.6 ml) was used in place of phenol. A solid catalyst was synthesized in the same manner as in (D) of Example 1 using this liquid titanium compound. Propylene was then polymerized under the same condition as in (E) of Example 1 using 47.1 mg of this solid catalyst. PP/cat Was 710 and HIP was 88.3 wt. %.

EXAMPLES 8 TO 17 AND COMPARATIVE EXAMPLES 9 AND 10

Solid catalysts were synthesized in the same manner as in Example 1 except that, in the synthesis of titanium compound in (C), phenol was replaced by the substituted phenols shown in Table 2. Propylene was polymerized under the same condition as in (E) of Example 1 using these solid catalysts. The results are shown in Table 2.

EXAMPLES 18 TO 23

Solid catalysts were synthesized in the same manner as in Example 1 except that the solid carrier (5 g) synthesized in the same manner as in Example 6 was used, and that, in the synthesis of titanium compound in (C) of Example 1, phenol was replaced by the substituted phenols shown in Tables 3 and 4. Propylene was polymerized under the same condition as in Example 6 or (E) of Example 1 using these solid catalysts. The results are shown in Tables 3 and 4, respectively.

TABLE 3

| Example | Substituted phenol | Amount | Average composition of titanium compound | PP/cat (g/g) | HIP (wt. %) |
|---|---|---|---|---|---|
| 18 | p-Chlorophenol | 16.0 ml | $Ti(O\text{---}C_6H_4\text{---}4\text{-}Cl)_{0.5}Cl_{3.5}$ | 15840 | 91.3 |
| 19 | o-Chlorophenol | 16.8 ml | $Ti(O\text{---}C_6H_4\text{---}2\text{-}Cl)_{0.5}Cl_{3.5}$ | 15190 | 91.0 |
| 20 | m-Methoxyphenol | 17.7 ml | $Ti(O\text{---}C_6H_4\text{---}3\text{-}OCH_3)_{0.5}Cl_{3.5}$ | 14870 | 91.9 |

TABLE 4

| Example | Substituted phenol | Amount | Average composition of titanium compound | PP/cat (g/g) | HIP (wt. %) |
|---|---|---|---|---|---|
| 21 | p-Methoxyphenol | 20.2 g | $Ti(O\text{---}C_6H_4\text{---}4\text{-}OCH_3)_{0.5}Cl_{3.5}$ | 5060 | 95.2 |
| 22 | o-Cresol | 17.1 ml | $Ti(O\text{---}C_6H_4\text{---}2\text{-}CH_3)_{0.5}Cl_{3.5}$ | 5090 | 95.4 |
| 23 | m-Cresol | 17.0 ml | $Ti(O\text{---}C_6H_4\text{---}3\text{-}CH_3)_{0.5}Cl_{3.5}$ | 5040 | 95.3 |

EXAMPLE 24

A solid catalyst was synthesized in the same manner as in Example 1 except that, in the synthesis of titanium compound in (C), titanium tetrachloride (30 ml) was reacted with phenol (12.8 g) in monochlorobenzene (70 ml) as solvent.

Propylene was polymerized under the same condition as in (E) of Example 1 using 39.9 mg of this solid catalyst to obtain 332.0 g of polypropylene which contained 13.6 g of an amorphous polymer. Consequently, PP/cat Was 8320 and HIP was 95.9 wt. %.

Also, propylene polymerization was carried out under the same condition as in (F) of Example 1 using 36.1 mg of this solid catalyst to obtain 246.7 g of polypropylene and 8.2 g of an amorphous polymer. Consequently, PP/cat was 7060 and HIP was 96.8 wt. %.

Further, propylene polymerization was carried out under the same condition as in (G) of Example 1 using 32.3 mg of this solid catalyst to obtain 505.8 g of polypropylene. PP/cat was therefore 15660. The content of an insoluble portion in polypropylene by Soxhlet extraction with boiling heptane was 95.0 wt. %.

TABLE 2

| No. | Substituted phenol | Amount | Average composition of titanium compound | PP/cat (g/g) | HIP (wt. %) |
|---|---|---|---|---|---|
| Example 8 | p-Cresol | 17.3 ml | $Ti(O\text{---}C_6H_4\text{---}4\text{-}CH_3)_{0.5}Cl_{3.5}$ | 5240 | 94.5 |
| Example 9 | p-Cresol | 3.4 ml | $Ti(O\text{---}C_6H_4\text{---}4\text{-}CH_3)_{0.1}Cl_{3.9}$ | 5120 | 94.4 |
| Example 10 | p-Cresol | 24.1 ml | $Ti(O\text{---}C_6H_4\text{---}4\text{-}CH_3)_{0.7}Cl_{3.3}$ | 5180 | 94.2 |
| Comparative Example 9 | p-Cresol | 34.4 ml | $Ti(O\text{---}C_6H_4\text{---}4\text{-}CH_3)Cl_3$ | 3510 | 93.4 |
| Example 11 | p-Phenylphenol | 27.6 g | $Ti(O\text{---}C_6H_4\text{---}4\text{-}C_6H_5)_{0.5}Cl_{3.5}$ | 5040 | 94.1 |
| Example 12 | o-Phenylphenol | 27.7 g | $Ti(O\text{---}C_6H_4\text{---}2\text{-}C_6H_5)_{0.5}Cl_{3.5}$ | 5190 | 94.0 |
| Example 13 | o-Phenylphenol | 5.5 g | $Ti(O\text{---}C_6H_4\text{---}2\text{-}C_6H_5)_{0.1}Cl_{3.9}$ | 5040 | 93.9 |
| Example 14 | o-Phenylphenol | 38.7 g | $Ti(O\text{---}C_6H_4\text{---}2\text{-}C_6H_5)_{0.7}Cl_{3.3}$ | 4980 | 93.7 |
| Comparative Example 10 | o-Phenylphenol | 55.3 g | $Ti(O\text{---}C_6H_4\text{---}2\text{-}C_6H_5)Cl_3$ | 3450 | 92.7 |
| Example 15 | o-tert-Butylphenol | 24.4 g | $Ti(O\text{---}C_6H_4\text{---}2\text{-}t\text{-}C_4H_9)_{0.5}Cl_{3.5}$ | 4970 | 93.8 |
| Example 16 | m-Phenylphenol | 27.6 g | $Ti(O\text{---}C_6H_4\text{---}3\text{-}C_6H_5)_{0.5}Cl_{3.5}$ | 4880 | 94.1 |
| Example 17 | β-Naphthol | 23.4 g | $Ti(O\text{---}C_{10}H_7)_{0.5}Cl_{3.5}$ | 4930 | 94.2 |

EXAMPLES 25 AND 26 AND COMPARATIVE EXAMPLE 11

Solid catalysts were synthesized in the same manner as in Example 28 except that, in the synthesis of titanium compound, the amount of phenol was changed as shown in Table 5. Propylene was then polymerized under the same condition as in (E) of Example 1 using these solid catalysts of amounts shown in Table 5. The results are shown in Table 5.

TABLE 5

| No. | Amount of phenol (g) | Composition of titanium compound | Amount of solid catalyst (mg) | PP/cat (g/g) | HIP (wt. %) |
|---|---|---|---|---|---|
| Example 25 | 2.57 | $Ti(OC_6H_5)_{0.1}Cl_{3.9}$ | 33.7 | 8510 | 96.1 |
| Example 26 | 18.0 | $Ti(OC_6H_5)_{0.7}Cl_{3.3}$ | 36.6 | 7200 | 95.2 |
| Comparative Example 11 | 25.7 | $Ti(OC_6H_5)Cl_3$ | 39.7 | 5210 | 94.5 |

EXAMPLES 27 AND 28

A monochlorobenzene solutoin of a titanium compound of the average composition, $Ti(OC_6H_5)_{0.5}Cl_{3.5}$, was synthesized in the same manner as in Example 28 except that, in the synthesis of titanium compound, monochlorobenzene, titanium tetrachloride and phenol were used in amounts shown in Table 6. Thereafter, a solid catalyst was synthesized in the same manner as in Example 28, i.e. Example 1, but using this solution. propylene was then polymerized under the same condition as in (E) of Example 1 using the solid catalyst thus obtained. The results are shown in Table 6.

TABLE 6

| Example | Monochlorobenzene (ml) | Titanium tetrachloride (ml) | Phenol (g) | PP/cat (g/g) | HIP (wt. %) |
|---|---|---|---|---|---|
| 27 | 90 | 10 | 4.28 | 5980 | 94.2 |
| 28 | 35 | 65 | 27.8 | 7250 | 95.4 |

EXAMPLES 29 TO 33

Solid catalysts were synthesized in the same manner as in Example 28 except that, in the synthsis of titanium compound, phenol was replaced by p-cresol, and that monochlorobenzene, titanium tetrachloride and p-cresol were used in varying amounts shown in Table 7. Propylene was then polymerized under the same condition as in (E) of Example 1 using these solid catalysts. The results are shown in Table 7.

TABLE 7

| Example | Monochlorobenzene (ml) | Titanium tetrachloride (ml) | p-Cresol (ml) | PP/cat (g/g) | HIP (wt. %) |
|---|---|---|---|---|---|
| 29 | 72.5 | 35.7 | 17.3 | 9120 | 96.1 |
| 30 | 97.4 | 10.8 | 5.2 | 6720 | 94.3 |
| 31 | 36.1 | 72.1 | 34.8 | 7940 | 95.8 |
| 32 | 72.5 | 35.7 | 3.4 | 8850 | 96.0 |
| 33 | 72.5 | 35.7 | 24.1 | 8980 | 95.4 |
| 34 | 72.5 | 35.7 | 34.4 | 5490 | 94.7 |

EXAMPLES 35 AND 36

Solid catalysts were synthesized in the same manner as in Example 29 except that, in the synthesis of titanium compound, nomochlorobenzene was replaced by p-xylene and n-decane. Propylene was then polymerized under the same condition as in (E) or Example 1 using these solid catalysts. PP/cat Was 8020 and HIP was 95.7 wt. % in Example 35 using p-xylene, and PP/cat was 7100 and HIP was 95.2 wt. % in Example 36 using n-decane.

EXAMPLE 37

A solid catalyst was synthesized in the same manner as in Example 6 except that, in the synthesis of titanium compound in (C), titanium tetrachloride (35.7 ml) was reacted with o-phenylphenol (11.1 g) in p-xylene (72.5 ml) as solvent. Propylene was then polymerized under the same condition as in (E) of Example 1 using 32.1 mg of this solid catalyst. PP/cat Was 7820 and HIP was 95.8 wt. %.

COMPARATIVE EXAMPLE 12

A solid catalyst was synthesized in the same manner as in Example 29 but using a monochlorobenzene solution of a titanium compound of the average composition, $Ti(OC_6H_4\text{-}4\text{-}CH_3)Cl_3$, obtained by mixing $Ti(OC_6H_4\text{-}4\text{-}CH_3)_4$ (0.081 mole) and $TiCl_4$ (0.244 mole) in monochlorobenzene (72.5 ml). Propylene was then polymerized under the same condition as in (E) of Example 1 using 30.3 mg of this solid catalyst. PP/cat Was 4860 and HIP was 93.7 wt. %.

EXAMPLE 38

(A) Synthesis of treated solid

Atmosphere in a 300-ml flask equipped with a stirrer and a thermometer was replaced by argon, and the solid product (20 g) obtained in the same manner as in (B) of Example 1 was added and slurried with addition of n-heptane (185 ml). Thereafter, ethyl benzoate (6 ml) was added with stirring, followed by reaction at 25° C. for 1 hour. After standing, the supernatant liquor was removed, and n-heptane (80 ml) was added, followed by stirring for 5 minutes. After standing, the supernatant liquor was removed. This washing cycle was repeated five times. The product was dried under reduced pressure to obtain 16.1 g of a treated solid.

(B) Synthesis of solid catalyst

A solid catalyst (3.6 g) was obtained in the same manner as in Example 29 except that the treated solid (5 g) obtained in (A) above was used in place of the solid product obtained in the same manner as in (B) of Example 1.

(C) Polymerization of propylene (I)

Propylene was polymerized in the same manner as in (E) of Example 1 except that 0.15 g of triethylaluminum and no methyl p-toluate were used. PP/cat Was 31320 and HIP was 92.4 wt. %.

(D) Polymerization of propylene (II)

Atmosphere in a 5-liter stainless steel autoclave equipped with a stirrer was replaced by argon, and triethylaluminum (0.845 g), methyl p-toluate (0.334 g), the solid catalyst (34.9 mg) synthesized in (B) above and then hydrogen corresponding to a partial pressure of 0.72 kg/cm² were added.

Thereafter, 1.3 kg of liquid propylene was charged under pressure, and polymerization was continued for 1 hour while maintaining the autoclave at 65° C.

The product was dried at 60° C. under reduced pressure to obtain 684.0 g of polypropylene. PP/cat Was 19600. On Soxhlet extraction for 6 hours with boiling heptane, the content of the insoluble portion was found to be 96.1 wt. %.

EXAMPLE 39

Atmosphere in a 200-ml flask equipped with a stirrer and a thermometer was replaced by argon, and monochlorobenzene (70 ml) as solvent, titanium tetrachloride (30 ml) and phenol (12.85 g) were added, followed by heating to 50° C. Reaction proceeded with evolution of hydrogen chloride gas. After keeping this temperature for 1 hour, the reaction solution (1 ml) was sampled, and its infrared absorption spectrum was measured to detect no absorption due to the streching vivration of the OH group of phenol. Thus, a liquid titanium compound of the average composition, $Ti(OC_6H_5)_{0.5}Cl_{3.5}$, was obtained.

To this solution were added ethyl benzoate (1.5 ml) and then the solid product (5 g) obtained in the same manner as in (A) and (B) of Example 1, followed by heating to 120° C. Contact reaction was carried out at 120° C. for 1 hour with stirring, and after standing, the supernatant liquor was removed at 120° C.

Thereafter, n-heptane (50 ml) was added, and the mixture was stirred at 90° C. for 5 minutes, followed by standing and removal of the supernatant liquor. This washing cycle was repeated five times. The product was then dried under reduced pressure to obtain 3.4 g of a solid catalyst containing 2.6 wt. % of titanium atom.

Propylene was polymerized under the same condition as in (E) of Example 1 using 31 mg of this solid catalyst. PP/cat Was 9050 and HIP was 96.6 wt. %.

Also, propylene was polymerized under the same condition as in (F) of Example 1 using 35 mg of this catalyst. PP/cat Was 7530 and HIP was 97.1 wt. %.

Further, propylene was polymerized under the same condition as in (G) of Example 1 using 30 mg of this catalyst. PP/cat Was 17200. On Soxhlet extraction for 6 hours with boiling heptane, the content of the insoluble portion was found to be 95.8 wt. %.

EXAMPLE 40

A solid catalyst was synthexized in the same manner as in Example 39 except that the amount of ethyl benzoate was changed to 3.75 ml. Paropylene was polymerized under the same condition as in (E) of Example 1 using 36 mg of this solid catalyst. PP/cat Was 7870 and HIP was 97.0 wt. %.

EXAMPLE 41

A solid catalyst was synthesized in the same manner as in Example 39 except that ethyl benzoate was replaced by 4.3 ml of ethyl p-anisate. Propylene was then polymerized in the same manner as in (E) of Example 1 except that 14 mg of this solid catalyst was used, and that 0.15 g of triethylaluminum and no methyl p-toluate were used. PP/cat Was 24500 and HIP was 93.0 wt. %.

What is claimed is:

1. A process for producing α-olefin polymers of high stereoregularity which comprises polymerizing an α-olefin having not less than three carbon atoms or copolymerizing said α-olefin with another olefin having not less than two carbon atoms in the presence of a catalyst system comprising:
   (A) a solid catalyst obtained by contact reaction between
      (a) a solid product prepared by reaction of an organo-magnesium compound with at least one of the following halogen-containing compounds (I) and (II) in a solvent comprising an ether compound or a mixture of an ether compound and a hydrocarbon compound,
         (I) halogenated silicon compounds of the formula, $R_nSiX_{4-n}$, in which R is a hydrocarbon group having 1 to 8 carbon atoms, X is a halogen atom and n is a number satisfying $0 \leq n < 4$,
         (II) halogenated aluminum compounds of the formula, $R_lAlX_{3-l}$, in which R is a hdyrocarbon group having 1 to 8 carbon atoms, X is a halogen atom and l is a number satisfying $0 \leq l < 3$, and
      (b) a titanium compound of the formula, $Ti(OAr)_nX_{4-n}$, in which OAr is an aryloxy group, X is halogen, n is a number satisfying $0.1 \leq n \leq 0.8$, the ratio of the number of titanium-aryloxy linkage to that of titanium is less than 1, and the valence of titanium is 4, and (B) an organoaluminum compound as an activating agent.

2. A process according to claim 1, wherein said organo-magnesium compound is represented by the formulae, RMgX and/or RR'Mg (in which R and R' are each a hydrocarbon group having 1 to 8 carbon atoms and X is a halogen atom).

3. A process according to claim 1, wherein said halogen-containing compound (I) is a halogenated silicon compound of the formula, $R_nSiX_{4-n}$ (in which r is a hydrocarbon group having 1 to 8 carbon atoms, X is a halogen atom and n is a number satisfying the equation, $0 \leq n \leq 1$).

4. A process according to claim 3, wherein the halogen-containing compound (I) is silicon tetrachloride.

5. A process according to claim 1, wherein said halogen-containing compound (II) is a halogenated aluminum compound of the formula, $R_lAlX_{3-l}$ (in which R is an ethyl group, X is a chlorine atom and l is a number satisfying the equation, $0 \leq l \leq 2$).

6. A process according to claim 1, wherein the solvent is an ether compound.

7. A process according to claim 6, wherein the amount of the ether compound is 0.1 to 10 times by mole based on the organo-magnesium compound.

8. A process according to claim 6, wherein the ether compound is an aliphatic or cyclic ether having 4 to 10 carbon atoms.

9. A process according to claim 1, wherein the molar ratio of the organo-magnesium compound to the halogen-containing compound is 1:10 to 10:1.

10. A process according to claim 9, wherein said molar ratio is 1:2 to 2:1.

11. A process according to claim 1, wherein the reaction between the organo-magnesium compound and the halogen-containing compound is carried out at −50° to 150° C.

12. A process according to claim 11, wherein said reaction is carried out at −30° to 80° C.

13. A process according to claim 1, wherein a time required for the reaction between the organo-magensium compound and the halogen-containing compound is 10 minutes or more.

14. A process according to claim 1, wherein the solid catalyst is one obtained by contact treatment of the solid product (a) with an electron donor, followed by contact reaction with the titanium compound (b), or by contact reaction of the solid product (a) with a mixture of the titanium compound (b) and electron donor.

15. A process according to claim 14, wherein the electron donor is an ester.

16. A process according to claim 16, wherein the ester is the ester of aromatic monocarboxylic acids.

17. A process according to claim 14, wherein the amount of the electron donor used is $10^{-5}$ to 0.1 mole per gram of solid product (a).

18. A process according to claim 17, wherein the amount of the electron donor used is $5\times10^{-4}$ to 0.02 mole per gram of solid product (a).

19. A Process according to claim 1, wherein the halogen in the titanium compound (b) is chlorine.

20. A process according to claim 1, wherein the aryloxy group in the titanium compound (b) is a phenoxy group and/or a subtituted phenoxy group.

21. A process according to claim 20, wherein the substitutent of the substituted phenoxy group is a hydrocarbyl, halogen, alkoxy or aryloxy group.

22. A process according to claim 21, wherein the substituent of the substituted phenoxy group is a hydrocarbyl group.

23. A process according to claim 1, wherein the solid catalyst is one obtained by contact reaction by slurring the solid product (a) in a liquid-form or solution-form titanium compound (b) or by impregnating the solid product (a) with a liquid-form or solution-form titanium compound (b).

24. A process according to claim 23, wherein the titanium compound (b) is in the form of solution in an inert solvent.

25. A process according to claim 24, wherein the inert solvent is one selected from aliphatic, alicyclic and aromatic hydrocarbons, and aliphatic and aromatic halogenated hydrocarbons.

26. A process according to claim 25, wherein the inert solvent is an aromatic hydrocarbon and/or a halogenated hydrocarbon.

27. A process according to claim 26, wherein the inert solvent is an aromatic halogenated hydrocarbon.

28. A process according to claim 24, wherein the concentration of the titanium compound (b) in the solution is 5 to 90% by volume.

29. A process according to claim 28, wherein the concentration of the titanium compound (b) in the solution is 10 to 70% by volume.

30. A process according to claim 23, wherein the amount of the liquid-form or solution-form titanium compound (b) per gram of solid product (a) is 0.1 to 100 ml.

31. A process according to claim 30, wherein the amount of the liquid-form or solution-form titanium compound (b) per gram of solid product (a) is 0.5 to 50 ml.

32. A process accordign to claim 1, wherein the contact reaction between solid product (a) and titanium compound (b) is carried out at 0° to 150° C.

33. A process according to claim 1, wherein a time required for the contact reaction between solid product (a) and titanium compound (b) is 30 minutes to 3 hours.

34. A process according to claim 1, wherein the organo-aluminum compound is one represented by the formula, $R_m^2AlY_{3-m}$, wherein $R^2$ is a $C_{1-8}$ straight or branched alkyl, or alicyclic or aromatic hydrocarbon group, Y is halogen or hydrogen and m is a number satisfying $2\leq m\leq 3$.

35. A process according to claim 1, wherein the molar ratio of a titanium atom in the solid catalyst to the activating agent is 10:1 to 1:1000.

36. A process according to claim 35, wherein the molar ratio is 2:1 to 1:600.

37. A process according to claim 1, wherein the catalyst system comprises the solid catalyst (A), the activating agent (B) and the electron donor (C).

38. A process according to claim 37, wherein the electron donor is an ester.

39. A process according to claim 38, wherein the electron donor is the ester of aromatic monocarboxylic acids.

40. A process according to claim 37, wherein the molar ratio of the activating agent to the electron donor is 100:1 to 1:10.

41. A process according to claim 40, wherein the molar ratio is 10:1 to 1:1.

* * * * *